US 9,244,289 B2

(12) United States Patent
Koyanagi

(10) Patent No.: US 9,244,289 B2
(45) Date of Patent: Jan. 26, 2016

(54) SCANNING DISPLAY DEVICE AND SPECKLE REDUCTION METHOD

(71) Applicant: ASAHI GLASS COMPANY, LIMITED, Chiyoda-ku (JP)

(72) Inventor: Atsushi Koyanagi, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 342 days.

(21) Appl. No.: 13/799,469

(22) Filed: Mar. 13, 2013

(65) Prior Publication Data

US 2013/0242365 A1 Sep. 19, 2013

(30) Foreign Application Priority Data

Mar. 16, 2012 (JP) ................. 2012-061095

(51) Int. Cl.
G02B 26/08 (2006.01)
G02B 27/48 (2006.01)
G02B 26/10 (2006.01)
G02B 27/28 (2006.01)

(52) U.S. Cl.
CPC ............... *G02B 27/48* (2013.01); *G02B 26/10* (2013.01); *G02B 26/101* (2013.01); *G02B 27/286* (2013.01)

(58) Field of Classification Search
CPC .... G02B 27/48; G02B 27/286; G02B 26/101; G02B 26/10
USPC ........ 359/207.9, 486.01, 489.01, 494.01, 707
See application file for complete search history.

(56) References Cited

U.S. PATENT DOCUMENTS

| 4,902,112 | A | 2/1990 | Lowe |
| 6,839,095 | B2 | 1/2005 | Bierhuizen et al. |
| 8,132,917 | B2 | 3/2012 | Osawa et al. |
| 8,696,134 | B2 | 4/2014 | Murakawa et al. |
| 2003/0071972 | A1 | 4/2003 | Ito et al. |
| 2004/0021942 | A1 | 2/2004 | Yamamoto et al. |
| 2008/0049321 | A1 | 2/2008 | McEldowney et al. |
| 2009/0034041 | A1* | 2/2009 | Grasser .......................... 359/204 |
| 2012/0013812 | A1* | 1/2012 | Gollier ........................... 348/744 |
| 2012/0062848 | A1 | 3/2012 | Koyanagi et al. |

FOREIGN PATENT DOCUMENTS

| JP | 2006-047422 A | 2/2006 |
| JP | 2010-217291 | 9/2010 |
| JP | 2010-244021 | 10/2010 |
| WO | WO 2007/105767 A1 | 9/2007 |
| WO | WO 2008/047800 A1 | 4/2008 |

* cited by examiner

Primary Examiner — James Phan
(74) Attorney, Agent, or Firm — Oblon, McClelland, Maier & Neustadt, L.L.P

(57) ABSTRACT

A scanning display device includes: a light source section including at least one light source configured to emitting coherent light; a light scanning section including: a scan mirror configured to reflect the light originated from the light source section and scan over a screen; and a turning section configured to turn the scan mirror; a depolarizer having outgoing polarized light distribution in which a state of polarization of outgoing light consecutively changes within an element plane, wherein: the depolarizer is placed in an optical path along which the light emitted by the light source section reaches the screen; and the state of polarization of the light is changed, thereby scanning the screen with light that has a polarized light distribution, in which the state of polarization consecutively changes, in a beam diameter.

13 Claims, 13 Drawing Sheets

GRADIENT DIRECTION

GRADIENT DIRECTION

DIRECTION OF CONSECUTIVE CHANGE

SCANNING DISPLAY DEVICE AND SPECKLE REDUCTION METHOD

BACKGROUND

1. Field of the Invention

The present invention relates to a scanning display device using a coherent light source and a speckle reduction method for such a scanning display device.

2. Description of the Related Art

Projectors employing laser light sources have recently been developed. Since the laser light source is superior in terms of monochromaticity and longer operating life, expectations are placed on the projectors of this type as next-generation projectors.

However, granular speckle noise attributable to coherence of the laser beam occurs in a projector which uses a laser beam having an aligned direction of polarization, which raises a problem of degradation of image quality.

An image display unit described as a technique for reducing such speckle noise in connection with; for instance, JP-A-2010-217291, has a liquid crystal device between a light source and a display area, wherein it is equipped with a birefringent liquid crystal layer to be activated in a state of dynamic scattering.

Moreover, JP-A-2010-244021, for instance, describes an image display unit that has, in an optical path of a laser beam, polarized light formation means for converting an incident laser beam into axially symmetric polarized light, and a projection plane is scanned with the polarized light to thereby render an image.

However, the speckle reduction technique utilizing scattered light, such as that descried in connection with JP-A-2010-217291, encounters a problem of degradation of image quality, like a contrast, which would otherwise be caused by scattering of a beam when the technique is applied to a scanning display device.

The speckle reduction technique described in connection with JP-A-2010-244021 requires generation of polarized light with an axially symmetric polarized light distribution or an inhomogeneous vector beam. This means that discontinuity inevitably exists in polarization within a beam diameter. Presence of such an area where polarization is discontinuous results in a problem of degradation of beam quality. Specifically, an outgoing beam undergoes diffraction to no small extent in the area where polarization is discontinuous, whereby a beam that is to form a pixel spreads, to thus degrade an image. Even when a vector beam formation element is formed from liquid crystal, an orientation distribution becomes discontinuous at a center of a center axis of a bundle of rays, which induces anomalous orientation. The anomalous orientation accounts for scattering, so that beam quality is degraded likewise.

Moreover, the speckle reduction technique described in connection with JP-A-2010-244021 encounters a problem of impairment of a depolarization function that would arise when an optical axis of the beam is not aligned to an axis of polarization rotation. For instance, suppose the vector beam formation element described in connection with JP-A-2010-244021 is interposed between a scan mirror and a screen. In this case, a beam enters the element while being deflected along a scan direction, and hence the optical axis of the beam cannot be aligned to the axis of polarization rotation at all times. Thus, there is a problem of limitations being imposed on a position where the vector beam formation element is to be placed.

Moreover, when the vector beam formation element cannot be placed in an optical path subsequent to a location where three colors of beams are to be merged because of a short distance of the optical path from the location where the beams are merged to a scan mirror, the vector beam formation element must be placed in each of optical paths of the respective colors of beams before being merged. This raises a problem of an increase in the number of components. Moreover, even when no problems are found in the position where the vector beam formation element is to be placed, there is another problem of requirement of high accuracy in aligning the optical axis of the beam to the axis of polarization rotation in order to yield a high speckle reduction effect.

SUMMARY

This invention aims at providing a speckle reduction method suitable particularly for a scanning display device and a scanning display device that realizes the method.

More specifically, the invention aims at providing a scanning display device capable of reducing speckle noise while preventing degradation of beam quality, which would otherwise be caused by scattering or diffraction, and a speckle reduction method for the scanning display device. Moreover, the invention aims at providing a scanning display device capable of reducing speckle noise by means of a simple configuration without a necessity for a high degree of assembly precision and a speckle reduction method for the scanning display device.

According to an aspect of the invention, there is provided a scanning display device including: a light source section including at least one light source configured to emitting coherent light; a light scanning section including: a scan mirror configured to reflect the light originated from the light source section and scan over a screen; and a turning section configured to turn the scan mirror; a depolarizer having outgoing polarized light distribution in which a state of polarization of outgoing light consecutively changes within an element plane, wherein: the depolarizer is placed in an optical path along which the light emitted by the light source section reaches the screen; and the state of polarization of the light is changed, thereby scanning the screen with light that has a polarized light distribution, in which the state of polarization consecutively changes, in a beam diameter.

For instance, the depolarizer can have a retardation distribution in which retardation consecutively changes within the element plane, thereby exhibiting the outgoing polarized light distribution.

Moreover, the retardation distribution achieved at that time may be one that causes a change of $0.5\lambda$ to $3\lambda$ with respect to the beam diameter.

Further, the depolarizer can have a birefringent layer made of a birefringent material, and the retardation distribution may also be exhibited by a thickness of the birefringent layer.

Furthermore, the depolarizer can have a birefringent layer made of a birefringent material, and the retardation distribution may also be exhibited by control of a tilt angle of an optical axis of the birefringent layer.

Also, for instance, the depolarizer can be one that has an optical axis distribution in which an orientation of an optical axis of a birefringent material consecutively changes within the element plane, to thereby exhibit the outgoing polarized light distribution.

In addition, the depolarizer having the optical axis distribution can also have a birefringent layer made of a birefringent material, and retardation of the birefringent layer may also be $\lambda/2 \pm 0.2\lambda$.

Further, for instance, the depolarizer can also have an optical axis distribution in which an optical axis causes a change from 45 degrees to 270 degrees with respect to a beam diameter.

Moreover, for instance, the depolarizer can also have an outgoing polarized light distribution in which a state of polarization of outgoing light changes within the element plane along a diametral orbit of a Poincare sphere.

Also, for example, the depolarizer can use liquid crystal polymer as the birefringent material.

According to another aspect of the invention, there is provided a speckle reduction method to be applied to a scanning display device that uses a coherent light source, including: placing a depolarizer that has an outgoing polarized light distribution in which a state of polarization of outgoing light consecutively changes within an element plane, in an optical path along which coherent light emitted by a light source section reaches a screen, thereby changing the state of polarization of light; and letting light, which has in its beam diameter a polarized light distribution in which a state of polarization consecutively changes, scan over the screen.

The invention provides the scanning display device that uses a coherent light source and can reduce speckle noise while preventing degradation of beam quality, which would otherwise be caused by scattering or diffraction.

The invention also provides a scanning display device that uses a coherent light source and can reduce speckle noise by means of a simple configuration without a necessity for a high degree of assembly precision.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
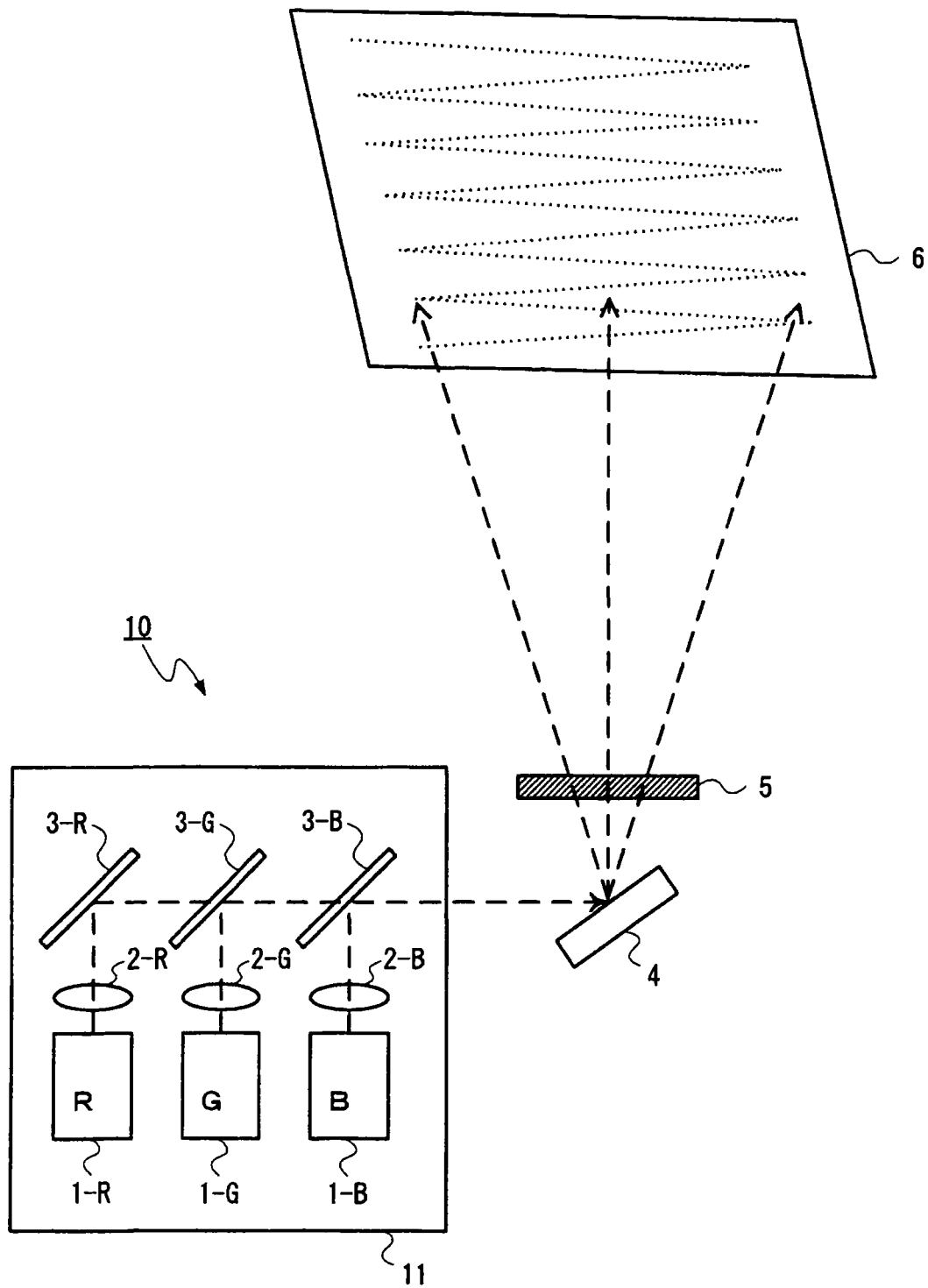
FIG. 1 is a constructive conceptual drawing of a scanning display device of the invention.

An embodiment for implementing the invention is hereunder described by reference to the drawings. To begin with, a configuration of a scanning display device of the invention is described. FIG. 1 is a constructive conceptual drawing showing an example configuration of a scanning display device of the invention. A scanning display device 10 shown in FIG. 1 is equipped with a 2D scan mirror 4 for scanning a display plane of a screen 6 with light, a light source optical system 11 for guiding coherent light to the 2D scan mirror 4, and a depolarizer 5 that changes polarization of light exiting from the 2D scan mirror 4 and outputs light which has in its beam diameter a predetermined, uneven polarized light distribution. The scanning display device can be structurally analogous to a common scanning image display unit except the depolarizer 5. For instance, the scanning display device can have, in place of the 2D scan mirror 4, a structure made up of a first scan mirror for effecting a horizontal scan with light and a second scan mirror for effecting a vertical scan with light.

As for the 2D scan mirror 4, a micromechanical mirror fabricated by the MEMS technique is advantageous in view of miniaturization. Moreover, a galvanometer mirror can be used for the first scan mirror and the second scan mirror. In addition, one of the scan mirrors can be formed from a galvanometer mirror, and the other one can be formed from a micromechanical mirror.

The light source optical system 11 can also include; for instance, at least one light source section 1 that emits coherent light, a collimator lens 2 for converting the light exiting from the light source section 1 into collimated light, and a dichroic mirror 3 that guides the collimated light exiting from the collimator lens 2 to the 2D scan mirror 4.

The scanning display device 10 shown in FIG. 1 includes, as the light source section 1 for emitting coherent light, laser light sources 1-R, 1-G, and 1-B that are formed from; for instance, a semiconductor laser or a solid-state laser, and that correspond respectively to three colors, red, blue, and green. Light rays exiting from the laser light sources 1-R, 1-G, and 1-B are collimated by respective collimator lenses 2-R, 2-G, and 2-B so as to turn into substantially collimated light rays. The thus-collimated light rays enter dichroic mirrors 3-R, 3-G, and 3-B, respectively. The light rays are then merged into three primary colors of laser beams by means of the dichroic mirrors 3-R, 3-G, and 3-B, and the laser beams then enter at an angle into a mirror plane of the 2D scan mirror 4. The substantially collimated light ray means a laser beam having a spread angle of about 2 mrad or less.

The light reflected from the 2D scan mirror 4 reaches a screen after passing through the depolarizer 5. The 2D scan mirror 4 is, at this time, actuated by mirror control means, which is omitted from the drawings, so as to make a horizontal turn and a vertical turn according to a predetermined scan frequency. As a result of turning action, a direction of the normal line on a light incident plane of the 2D scan mirror 4 changes with respect to an optical axis of an incoming laser beam. An optical axis of the laser beam reflected from the plane also changes every time the 2D scan mirror 4 is turned.

As above, the laser beam reflected from the 2D scan mirror 4 irradiates a predetermined area while scanning or traversing across the screen, thereby displaying a desirable image on the entire screen.

The scanning display device 10 shown in FIG. 1 has the depolarizer 5 interposed between the 2D scan mirror 4 and the screen 6. Accordingly, the light reflected from the 2D scan mirror 4 arrives at the screen after passing through the depolarizer 5. As has already been described, the depolarizer 5 changes polarization of the incident light, to thus emit light that has a predetermined, uneven polarized light distribution in a beam diameter of the incident light. Consequently, the light reflected from the 2D scan mirror 4 arrives at the screen 6 after being converted, by the depolarizer 5, into light that has a predetermined, uneven polarized light distribution in a beam diameter.

The essential requirement for the depolarizer 5 is that it should exhibit an outgoing polarized light distribution in which a state of polarization of outgoing light consecutively changes in an element plane. Using such an element makes it possible to change linearly polarized incident light into light that has in its beam diameter a polarized light distribution in which a state of polarization changes consecutively.

Consecutive changing of the state of polarization referred to herein means consecutive changing on the Poincare sphere that represents a state of polarization. In view of enhancement of depolarization, it is desirable that the state of polarization should change substantially on a diametral orbit of the Poincare sphere in order to depolarize. In the case of; for instance, a change in an equatorial orbit of the Poincare sphere, an angle of polarization of linearly polarized light comes to change consecutively. Moreover, in the case of; for instance, a change on an orbit stretching from the North pole to the South pole of the Poincare sphere, ellipticity comes to change consecutively. A state of polarization of outgoing light in a continuous area arranged along a given direction, such as a vertical direction and a horizontal direction of an element, may also be, as one specific example, a polarized light distribution that iterates a change commensurate with a magnitude of a phase difference. In the polarized light distribution; for instance, a change occurs from horizontal linearly polarized light to clockwise elliptically polarized light whose major axis of polarization is oriented in a horizontal direction; from the clockwise elliptically polarized light to clockwise circularly polarized light; from the clockwise circularly polarized light to vertical clockwise elliptically polarized light perpendicular to linearly polarized light whose major axis of polarization is horizontal; from the clockwise elliptically polarized light to vertical linearly polarized light; from the vertical linearly polarized light to counterclockwise elliptically polarized light whose major axis of polarization is vertical; from the counterclockwise elliptically polarized light to counterclockwise circularly polarized light; from the counterclockwise circularly polarized light to counterclockwise elliptically polarized light whose major axis of polarization is horizontal; and from the counterclockwise elliptically polarized light to horizontal linearly polarized light.

Incidentally, a change in the outgoing polarized light distribution can be oriented in any direction. However, if the change exhibits directionality; for instance, a vertical direction or a horizontal direction, with respect to an element plane, it will become easy to determine orientation of the element during arrangement. For this reason, it is preferable for the outgoing polarized light distribution to exhibit directionality.

The depolarizer 5 exhibiting such a distribution of outgoing polarized light can be embodied by imparting; for instance, a retardation distribution in which retardation consecutively changes within the element plane, to an element.

FIGS. 2 through 4 and FIG. 7 are schematic cross sectional views showing an example of configuration of the depolarizer 5 of the embodiment. All depolarizers 5A, 5B, 5C, and 5D shown in FIGS. 2 through 4 and FIG. 7 are examples of the depolarizer 5 that has a retardation distribution in which retardation consecutively changes within the element plane. Hereunder, a depolarizer that has such a retardation distribution is often called a retardation-distribution-type depolarizer.

Retardation Rd in a certain area is expressed by Equation (1) provided below. Reference symbol $\Delta n$ designates birefringence of the area; namely, $|n_e - n_o|$; and "d" designates a thickness of a birefringent layer in that area.

$$Rd = \Delta n \cdot d \qquad \text{Eq. (1)}$$

Figure 2:
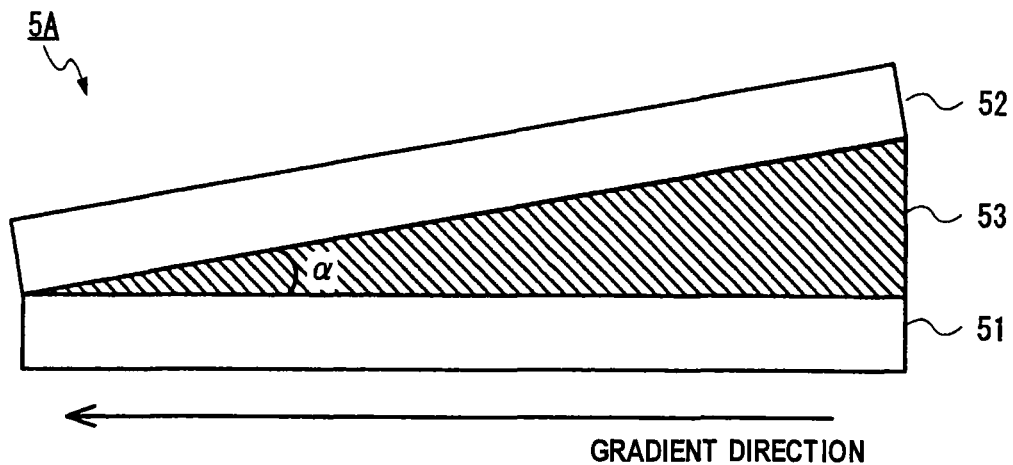
FIG. 2 is a schematic cross sectional view showing an example of a depolarizer 5 of an embodiment.
Figure 3:
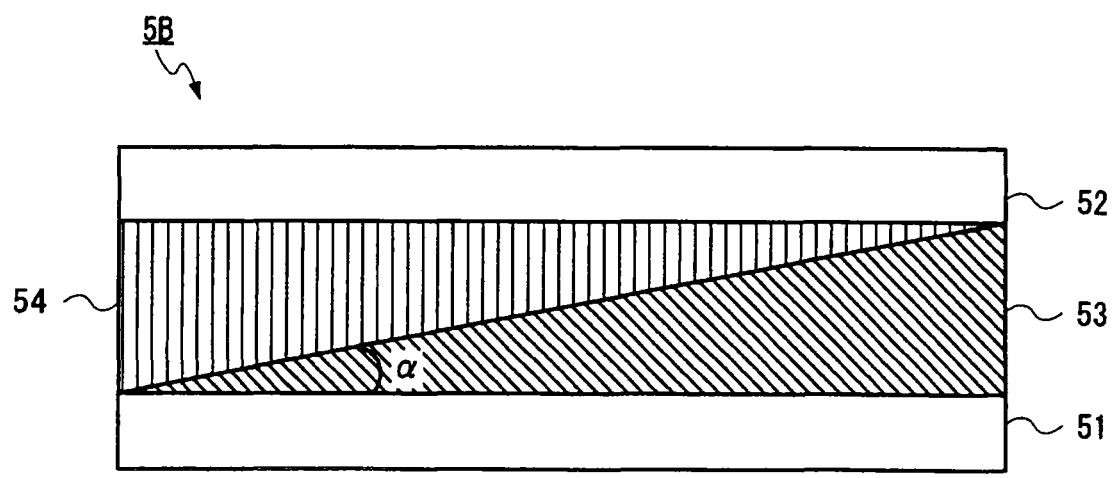
FIG. 3 is a schematic cross sectional view showing an example of the depolarizer 5 of the embodiment.
Figure 4:
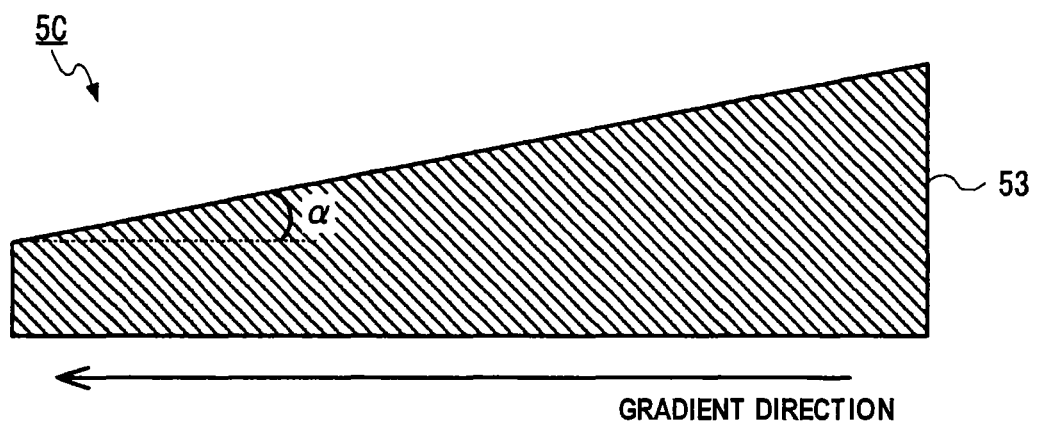
FIG. 4 is a schematic cross sectional view showing an example of the depolarizer 5 of the embodiment.
Figure 7:
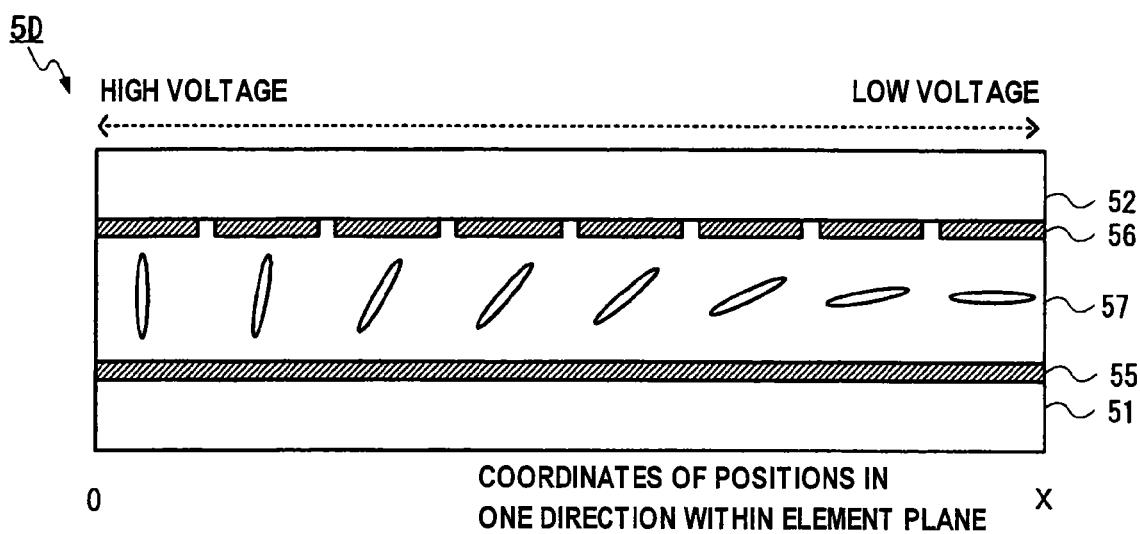
FIG. 7 is a schematic cross sectional view showing another example of the depolarizer 5 of the embodiment.

A retardation distribution that consecutively changes within the element plane is given by Equation (1), so long as the symbol "d" or $\Delta n$ is consecutively changed. The depolarizers 5A, 5B, and 5C shown in FIGS. 2 through 4 are examples of the depolarizer 5 that has the retardation distribution which consecutively changes by consecutively changing a thickness of the birefringent material in the element plane. Further, the depolarizer 5D shown in FIG. 7 is an example of the depolarizer 5 that exhibits a retardation distribution in the element plane which consecutively changes by means of consecutively changing $\Delta n$.

The depolarizer 5A shown in FIG. 2 is an example of the depolarizer 5 that exhibits a retardation distribution which consecutively changes by means of consecutively changing the thickness of the birefringent material. The depolarizer 5A assumes a structure in which a gradient birefringent layer 53, which is made of liquid crystal polymer oriented in a given direction, is sandwiched between two transparent substrates 51 and 52 that are bonded together not parallel to each other but one at a predetermined gradient angle α with respect to the other in a given direction.

Various materials, such as a resin plate and a resin film, can be used for the transparent substrates 51 and 52, so long as they exhibit transparency to incident light. Use of an inorganic material, like glass and quartz glass, is desirable in light of durability. Further, use of an optically isotropic material is desirable, because transmitted light is not affected by birefringence.

The gradient birefringent layer 53 can be fabricated by bonding together; for instance, the two transparent substrates 51 and 52 whose surfaces, which will face inside when the substrates are bonded together, are each provided with alignment layers (not shown), such that the other one tilts at a given gradient angle α in a given direction with respect to the one, to thus create a empty cell having a wedge-shaped cross sectional profile; filling a gap of the cell with photopolymerizable liquid crystal monomer; and curing the liquid crystal polymer by exposure to UV light.

In addition to the liquid crystal polymer, a birefringent crystal; for instance, quartz and $LiNbO_3$, and a birefringent film made by stretching an organic film; for instance, polycarbonate, can also be used as the birefringent material. Use of liquid crystal polymer is preferable, because it enables inexpensive formation of the birefringent layer and facilitates control of a thickness distribution and an optical axis distribution.

Available as the alignment layer are one which is formed by rubbing a resin film against polyimide, or the like; an obliquely evaporated film that is made by obliquely evaporating an inorganic material, such as a silicon oxide; and an optical alignment layer that induces orientation capability by exposing an organic film to UV light, or the like.

The gradient birefringent layer 53 that is thus fabricated at an angle can also be called a monogradient structure 53 made of a birefringent material. The monogradient structure is a structure that has one gradient plane which continues to the substrate plane at substantially the same gradient direction and the same gradient angle α (0 degree<α<90 degrees). When the gradient is approximated by means of stair-like portions, the stair-like portions are deemed to assume substantially the same gradient angle.

The birefringent material is thus given a thickness distribution, whereby an element in which retardation consecutively changes in the direction of a gradient can be obtained. Although omitted from the example shown in FIG. 2, an antireflection film can also be formed over an exterior surface of each of the two transparent substrates 51 and 52.

In the depolarizer 5A shown in FIG. 2, the gradient of the gradient birefringent layer 53 serves, as is, as a thickness gradient of the element. However, when the element is desired to have a constant thickness, there can also be employed a configuration in which an isotropic medium layer 54 is placed in a gap that occurs between the gradient birefringent layer 53 and the other substrate when the two transparent substrates 51 and 52 are placed in parallel as in the case of the depolarizer 5B shown in FIG. 3.

The essential requirement for fabrication of the depolarizer 5B shown in FIG. 3 is to form the isotropic medium layer 54, or a monogradient structure, from an isotropic refractive material on one transparent substrate (the transparent substrate 52 in the embodiment) by means of; for instance, imprinting with use of a molding die; form an alignment layer over the isotropic medium layer 54; and bond the two transparent substrates 51 and 52 in parallel to each other. A cell gap in the thus-fabricated empty cell is filled with photopolymerizable liquid crystal monomer and the thus-filled monomer is cured by exposure to UV light.

Moreover, the gradient birefringent layer 53 can also be fabricated directly on a quartz crystal substrate by abrasion of the quartz crystal substrate as in the case of; for instance, the depolarizer 5C shown in FIG. 4. The depolarizer 5C shown in FIG. 4 can also be said to be a structure that has only the monogradient structure 53 formed from quartz crystal.

Figure 5:
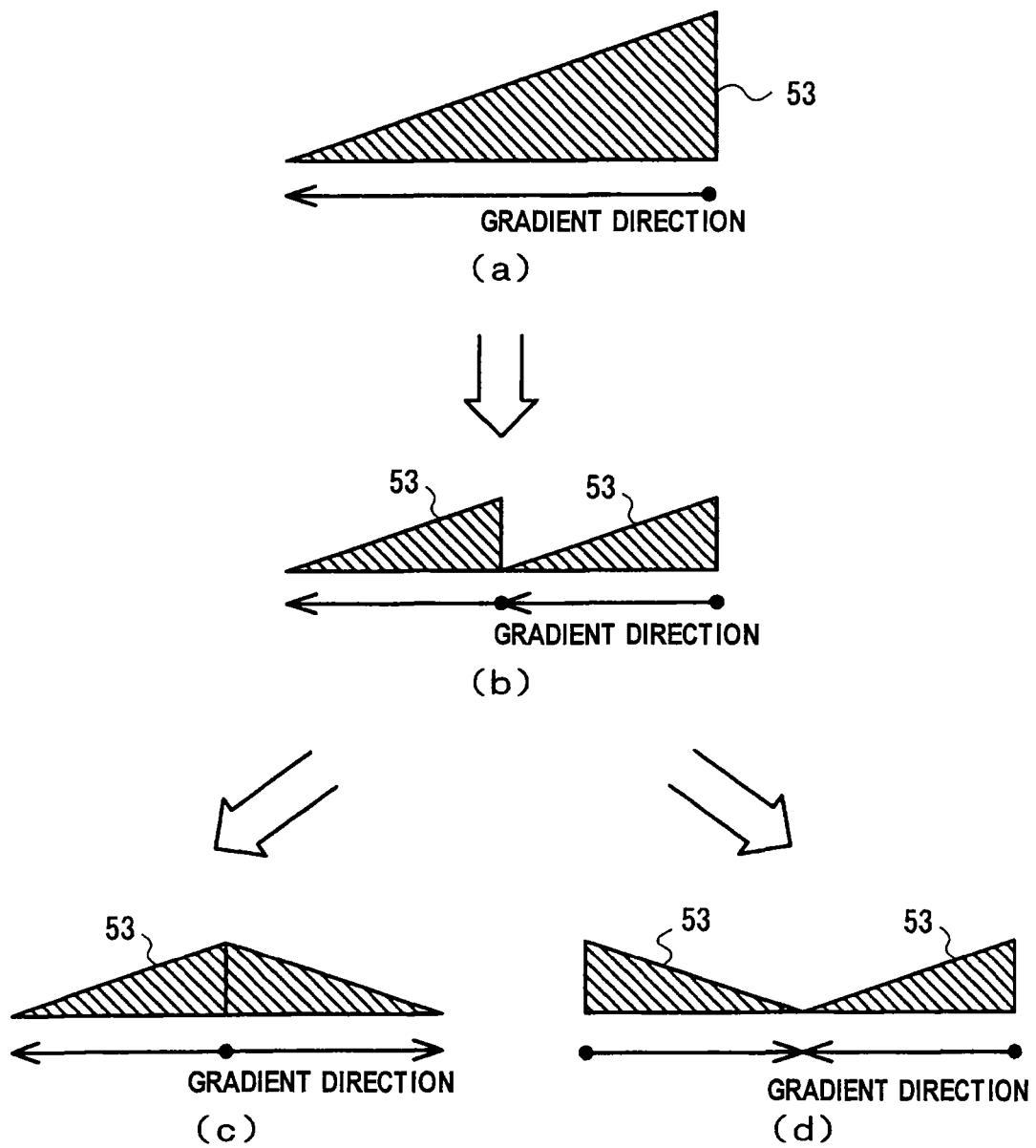
FIG. 5 is an explanatory view showing an example of splitting a monogradient structure 53.

FIGS. 2 through 4 show an example in which one monogradient structure 53 is fabricated in the element plane. Alternatively, as shown in FIG. 5, a plurality of sub-monogradient structures 53 can be fabricated by dividing the monogradient structure 53. FIG. 5 is an explanatory views showing exemplary division of the monogradient structure 53. When the gradient structure 53 is divided, it is preferable that the monogradient structure be positioned so as not to cause a sharp step in the birefringent material layer from the viewpoint of realization of a distribution in which retardation consecutively changes. Specifically, merely dividing a gradient of the gradient structure into sub-divisions and combining the sub-divisions with each other result in formation of a saw-toothed cross sectional profile (see a section (b) of FIG. 5). All you need to do is to combine the sub-divisions in such a way that an up-gradient and a down-gradient are positioned one after another; namely, an up-gradient being followed by a down-gradient or a down-gradient being followed by an up-gradient. Specifically, the sub-divisions are combined with each other; namely, a gradient direction is inverted between adjoining gradient structures (see sections (c) and (d) of FIG. 5). When the sub-divisions of the gradient structure are combined to each other as mentioned above, a top and a bottom of a gradient structure can also be given a curvature in such a way that a rate of change of retardation is continuously, smoothly changed. The embodiment shown in FIG. 5 shows an example in which the gradient structure is divided in two sub-divisions; however, the gradient structure is not limited in connection with the number of sub-divisions.

Incidentally, an optical axis (i.e., a direction of extraordinary refraction or a direction of ordinary refraction) of a birefringent material that is a material of each of the monogradient structures 53 can be arbitrary. However, it is preferable that the monogradient structure be fabricated such that an angle which the optical axis forms with the direction of incident polarized light after being placed come to 45 degrees. The reason for this is that, provided that an angle which the optical axis forms with the direction of incident polarized light is 45 degrees, polarization can be depolarized most efficiently.

Figure 6:
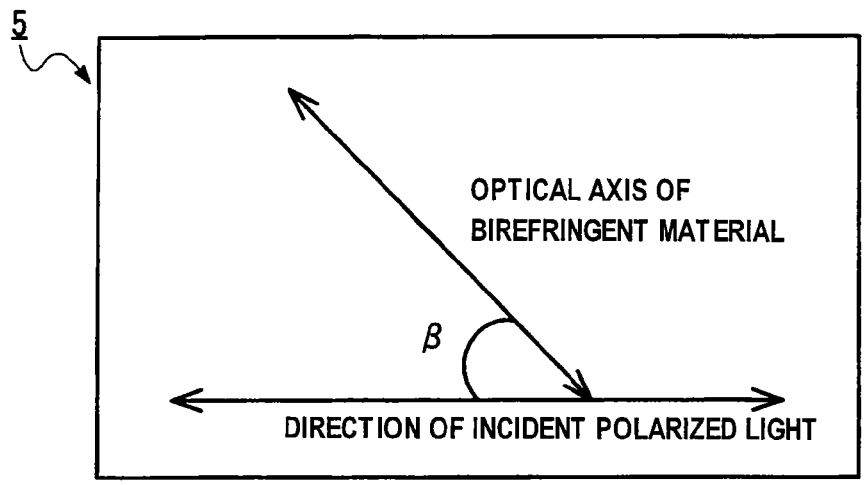
FIG. 6 is an explanatory view showing a relationship between a direction of polarized light which enters the depolarizer 5 and an optical axis of a birefringent material.

For instance, as shown in FIG. 6, when liquid crystal polymer is used, the two transparent substrates 51 and 52 can also be bonded together, on the assumption that incident polarized light has a direction of polarization is parallel to a certain side of the element, in such a way that the upper substrate and the lower substrate are anti-parallel to each other; namely, they are opposite to each other in terms of a direction of orientation treatment, and that an angle β which a rubbing direction forms with a side of interest of the element comes to +45 degrees or −45 degrees. Moreover, for instance, when a quartz crystal substrate is used, the substrate can also be abraded while a gradient direction is set in such a way that an angle β which an optical axis of the quartz crystal substrate forms with the side of interest of the element comes to +45 or −45 degrees.

Polarization can be depolarized efficiently when the angle β which the direction of incident polarized light forms with the optical axis of the birefringent material falls preferably within a range of 45 degrees±20 degrees and more preferably within a range of 45 degrees±10 degrees.

FIG. 7 is an explanatory view showing an example of the depolarizer 5 that exhibits an Rd distribution which consecutively changes within the element plane by consecutively changing Δn. More specifically, FIG. 7 is an explanatory view showing an example of the depolarizer 5 formed in such a way that a tilt angle of liquid crystal molecules shows a distribution within the element plane by control of orientation.

The depolarizer 5D shown in FIG. 7 has the two transparent substrates 51 and 52 and a liquid crystal layer 57 sandwiched between the transparent substrates 51 and 52. A transparent electrode 55 for controlling the tilt angle of liquid crystal molecules of the liquid crystal layer 57 is formed over one surface of the transparent substrate 51; more specifically, a surface which is to face inside when the transparent substrate 51 is bonded to its counterpart substrate. A transparent electrode 56 for controlling the same is formed over one surface of the transparent substrate 52; more specifically, a surface which is to face inside when the transparent substrate 52 is bonded to its counterpart substrate.

FIG. 7 shows an example in which a common electrode 55 is formed over the transparent substrate 51 and in which a divided transparent electrode 56 is fabricated on the transparent substrate 52 that is an opposed substrate of the transparent substrate 51. A stripe-shaped electrode pattern, and the like, is mentioned as an electrode pattern. A high resistance film and a power supply electrode can also be used as means for exhibiting a voltage distribution. They are preferable in such a case, because they can consecutively exhibit a voltage distribution and retardation changes.

UV cure liquid crystal polymer is preferable as the birefringent material that makes up the liquid crystal layer 57, because it can control a direction of orientation by means of a voltage. The UV cure liquid crystal polymer is brought in desirable orientation by means of a voltage and cured in this state by exposure to UV light. Even after the voltage is shut off, the liquid crystal polymer can be held in the desirable orientation. Moreover, it is preferable to use a transparent conductive film which is an oxide; for instance, an ITO (Indium Tin Oxide), an AZO (Aluminum Zinc Oxide), and a GZO (Gallium Zinc Oxide), for the transparent electrodes 55 and 56, because it provides high transparency and conductivity.

Each of the transparent substrates 51 and 52 can also have an alignment layer (not shown) in which liquid crystal molecules of the liquid crystal layer 57 are oriented. Available as the alignment layer are one which is formed by rubbing a resin film such as a polyimide, or the like; an obliquely evaporated film that is made by obliquely evaporating an inorganic material, such as a silicon oxide; and an optical alignment layer that induces orientation capability by exposing an organic film to UV light, or the like.

FIG. 7 shows, by means of a uniaxial index ellipsoid, a distribution of an optical axis of a birefringent material that makes up the liquid crystal layer 57. In the example shown in FIG. 7, effective birefringence exhibited by incident light at a left end of the liquid crystal layer 57 in the drawing is zero. Effective birefringence exhibited by incident light at the right end of the liquid crystal layer 57 in the drawing is $\Delta n$. A tilt of the ellipsoid gradually changes from the left end to the right end in the drawing. This shows that the effective birefringence $\Delta n$ changes according to the tilt of the ellipsoid.

Figure 8:
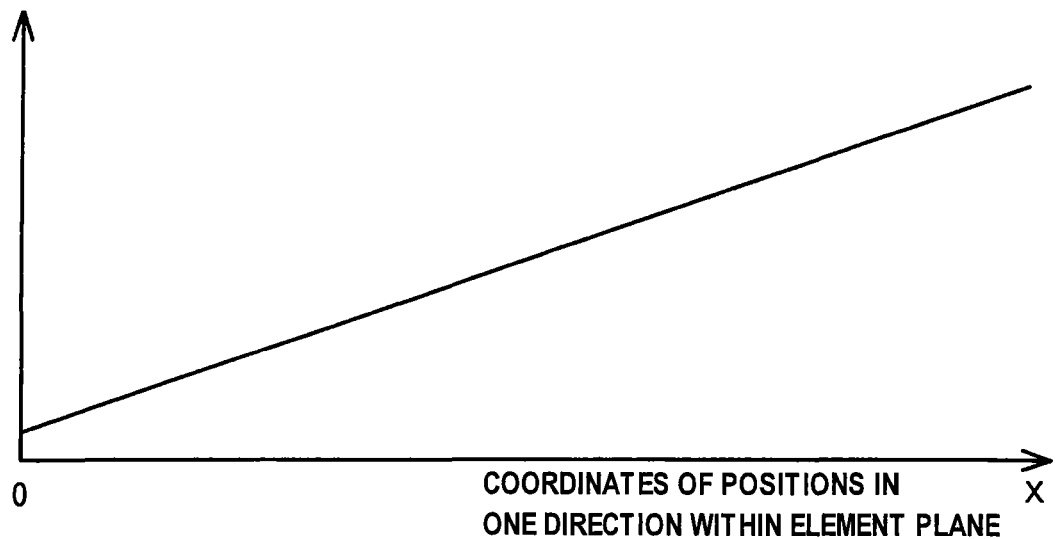
FIG. 8 is an explanatory view showing an example of a retardation distribution.

FIG. 8 shows an example of in-plane distribution of retardation in the depolarizer 5D shown in FIG. 7. A left end of FIG. 8 corresponds to a left-end region of FIG. 7. Likewise, a right end of FIG. 8 corresponds to a right-end region of FIG. 7. Although omitted from the drawing, the depolarizer 5D has a voltage controller that controls a voltage to be applied to the divided transparent electrode 56 and the common electrode 55 pursuant to an external command. As mentioned above, the depolarizer 5D controls the tilt angle of liquid crystal molecules of the liquid crystal layer 57 by use of the voltage controller, or the like, thereby imparting an in-plane gradient to retardation.

Although omitted from the drawings, the depolarizer 5D can also have an antireflection film, which is made of a multilayer film, along an interface between the transparent substrate and air. In order to decrease the thickness of the element, one or both of the transparent substrates respectively on which the transparent electrodes are formed can be removed. Alternatively, after removal of the transparent substrate on which the transparent electrode is formed, another transparent substrate on which the transparent electrode is not formed can also be arranged.

Figure 9:
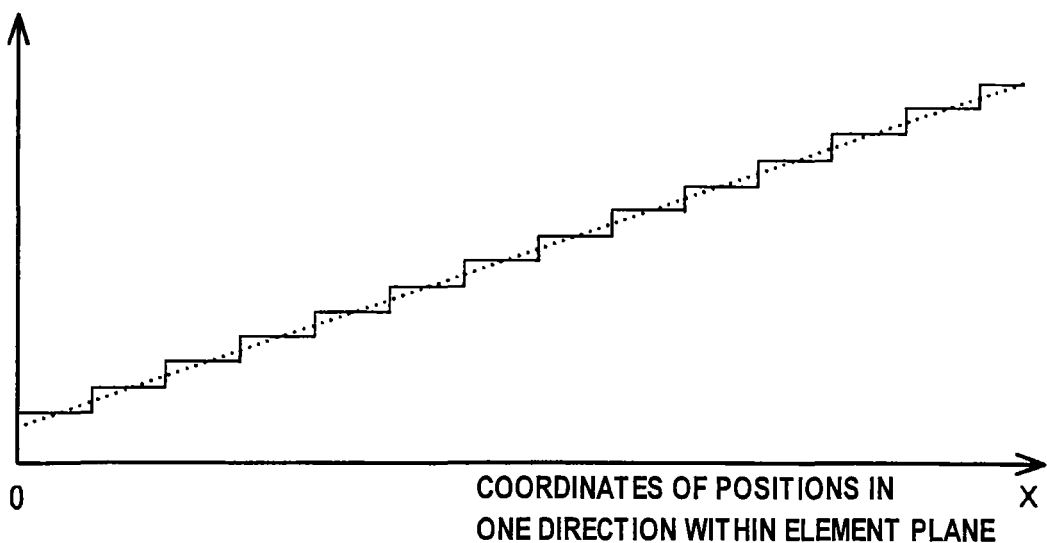
FIG. 9 is an explanatory view showing another example of the retardation distribution.

The retardation-distribution-type depolarizer 5 is not limited to the configurations described in connection with the above respective examples. Any element is employed as the depolarizer 5, so long as it is configured so as to exhibit retardation distribution in which retardation consecutively changes in the element plane. Although an expression stating that retardation, a thickness, and a refractive index consecutively change within the element plane is used in the invention, the term "consecutively" is not necessarily limited to a case where changes of the values always show a given amount of increase or decrease in an area that is continuous in a given direction. An essential requirement for this is; for instance, that their values change within a predetermined range according to a predetermined rule (that is not limited to a simple increase or a simple decrease and includes a cyclic structure made up of a combination thereof, and the like) in the area that is continuous in a given direction. For instance, in the case where retardation consecutively changes, a geometry of a graph, which shows values of retardation acquired at positions of coordinates along a line of a certain direction within the element plane, includes a linear shape showing a simple increment or a simple decrement, a curved shape like a sine curve, shapes similar to these in a stair-like pattern, and a combination of them like an incremental shape followed by a decremental shape or another combination of them like a decremental shape followed by an incremental shape. For instance, FIG. 9 is an explanatory view showing an example of a retardation distribution that approximates to a simple incremental retardation distribution in the form of a stair-like pattern. Even such a case where the retardation value varies in a multivalued manner, the variations can also be deemed as consecutive changes. As to a criterion for determining whether or not retardation consecutively changes, when a change in retardation between adjacent regions falls within a range of 100 m$\lambda$, the change can be determined to be a continuous change. A range of 50 m$\lambda$ or less is more preferable.

It is more preferable that the retardation distribution should exhibit a change which falls within a beam diameter of $0.5\lambda$ to $3\lambda$. This means that a change in a state of polarization laps around half (i.e., $0.5\lambda$) to three times ($3\lambda$) the Poincare sphere with respect to the beam diameter. The beam diameter refers to a beam diameter of coherent light emitted from the light source section. For instance, in the case of a beam exhibiting a Gaussian distribution, a beam diameter in which emissive power assumes a peak value of $1/e^2$ (13.5%) is called a beam diameter.

Figure 10:
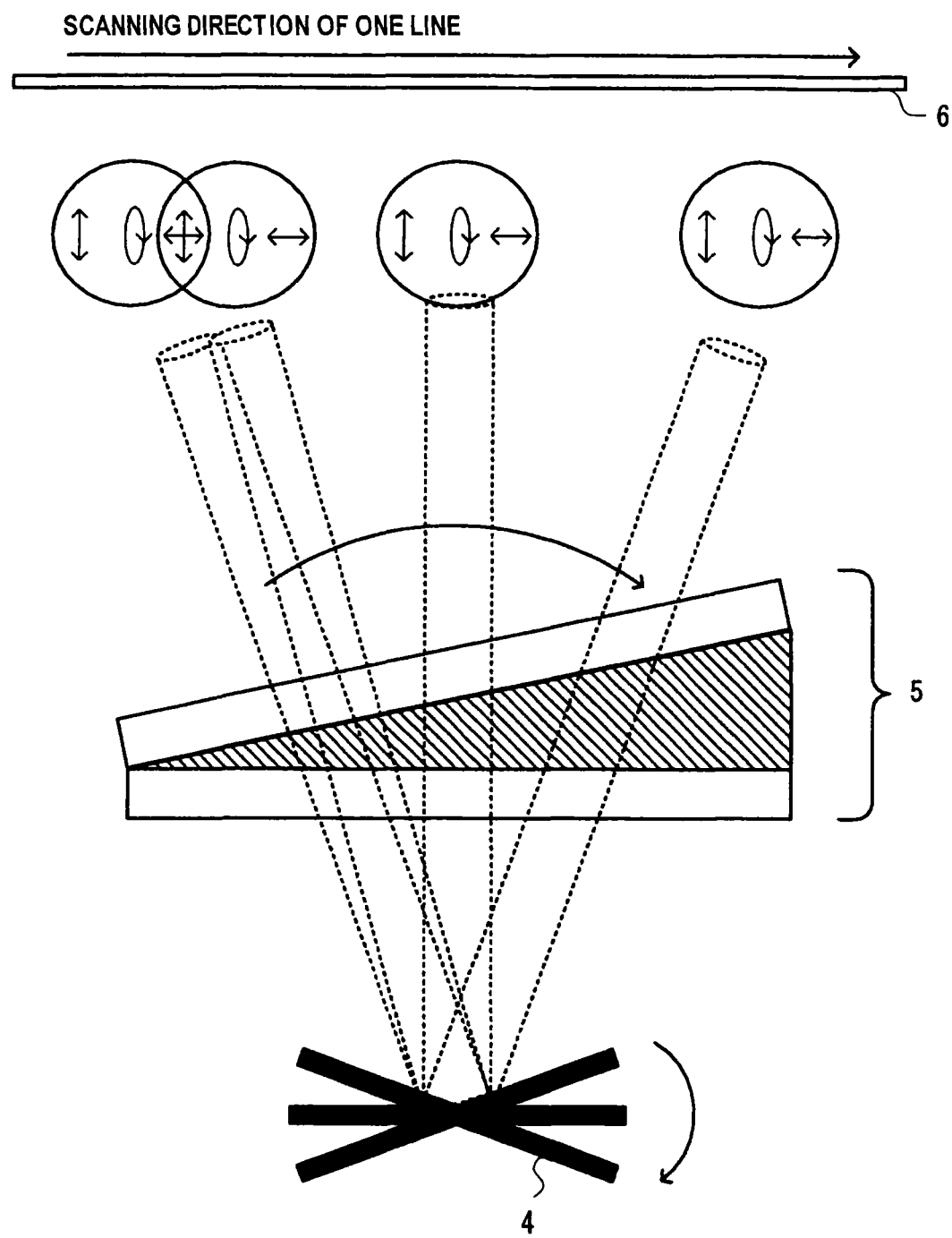
FIG. 10 is an explanatory view for explaining a principle of speckle reduction of the invention.

The principle of speckle reduction underlying the invention is now described by reference to FIG. 10. FIG. 10 is an explanatory view for describing the principle of speckle reduction underlying the invention. As shown in FIG. 10, in the scanning display device of the invention, different speckle patterns are formed from polarized light in a domain of spatial resolution of human eyes by combination of polarization control performance of the depolarizer 5 with revolution of the scan mirror 4, and the patterns are superposed one upon another within a domain of temporal resolution of the human eyes, thereby bettering speckle noise.

The example shown in FIG. 10 illustrates a case where overlaps exist among beams. However, even when no overlap exists among beams, the beams are recognized as a single spot by means of spatial resolution of the human eyes. Hence, a similar effect is considered to be yielded.

Specifically, regardless of whether or not beams physically overlap each other, beams that are horizontally-adjacent to each other are incoherent in the process of scanning, and beams that are vertically-adjacent to each other are incoherent in the process of scanning. Even when consideration is given to a time when the beam arrives at an adjoining pixel, a semiconductor laser involving a short coherent time is considered to have already lost its coherence between adjoining pixels. Incidentally, under the speckle reduction method of the invention, when an uneven polarized light distribution, like scanning beams polarized orthogonally, exists in a beam diameter, different speckle patterns are formed, in a domain of spatial resolution of the eyes, from different incoherent polarized light rays existing between adjacent pixels. Such different speckle patterns are superposed one upon another in a period of temporal resolution of the eyes of the order of 50 to 100 ms during which one screen is formed, whereby speckle contrast is reduced. Under the speckle reduction method of the invention, polarized light rays are multiplexed in such a broad sense, so that speckle noise can be reduced.

Figure 11:
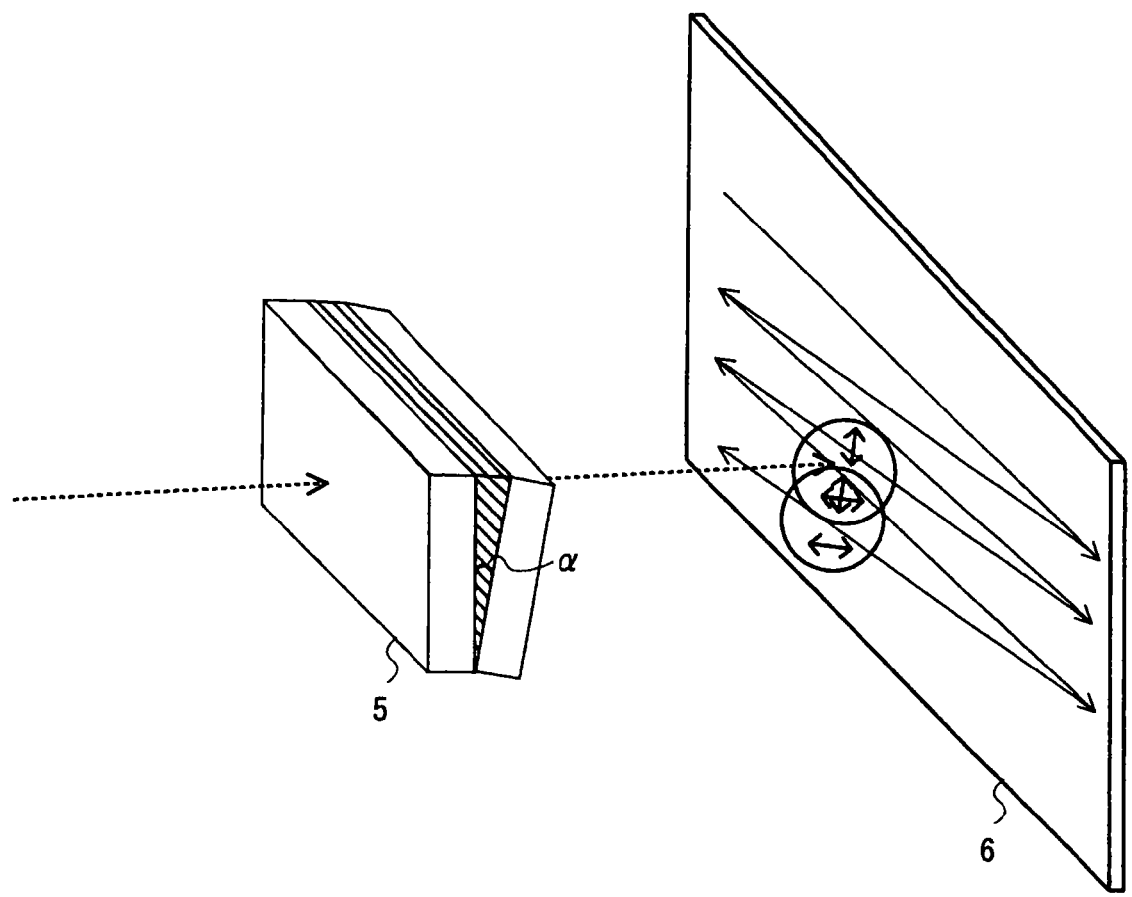
FIG. 11 is an explanatory view showing an example of multiplexing polarized light rays in the scanning display device of the invention.
Figure 12:
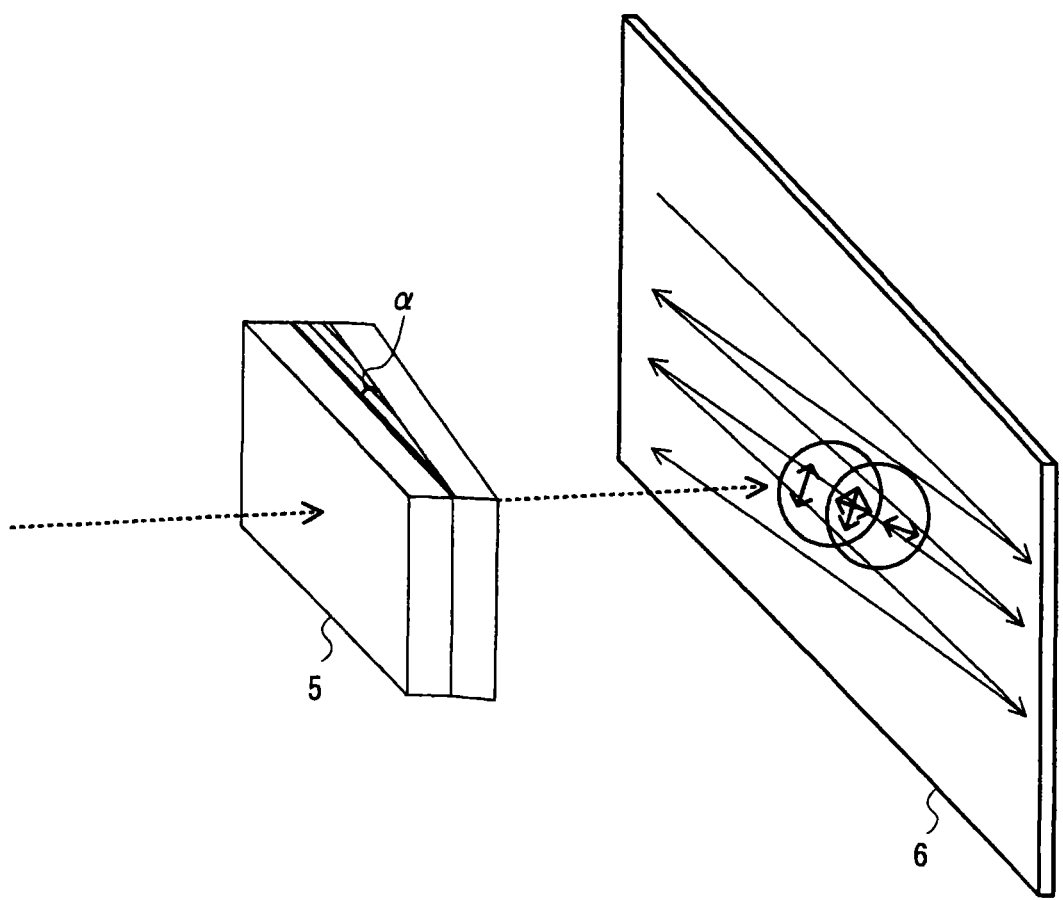
FIG. 12 is an explanatory view showing the example of multiplexing polarized light rays in the scanning display device of the invention.

FIGS. 11 and 12 are explanatory drawings showing an example of multiplexing polarized light rays in the scanning display device of the invention. FIG. 11 is an explanatory view showing an example of multiplexing polarized light rays by use of the depolarizer 5 that has retardation distribution which changes retardation along the longitudinal direction. The longitudinal direction referred to therein means the one along which pixels to be projected on a screen are interconnected in a vertical direction, whilst the lateral direction means the one along which the pixels are interconnected in a horizontal direction. In the example shown in FIG. 11, different speckle patterns are formed from the different polarized light rays that exist between the vertically aligned pixels, and the thus-formed speckle patterns are superposed one upon another within the domain of resolution of the human eyes, thereby enabling reduction of the speckle noise.

FIG. 12 is an explanatory view showing an example of multiplexing polarized light rays by use of the depolarizer that has a retardation distribution in which retardation changes in the horizontal direction. In the example shown in FIG. 12, different speckle patterns are formed from different polarized light rays existing between the horizontal pixels. The thus-formed speckle patterns are superposed one upon another within a domain of temporal resolution of the human eyes, thereby enabling reduction of the speckle noise. The example of placement of the depolarizer 5 is not limited to that mentioned above.

Figure 13:
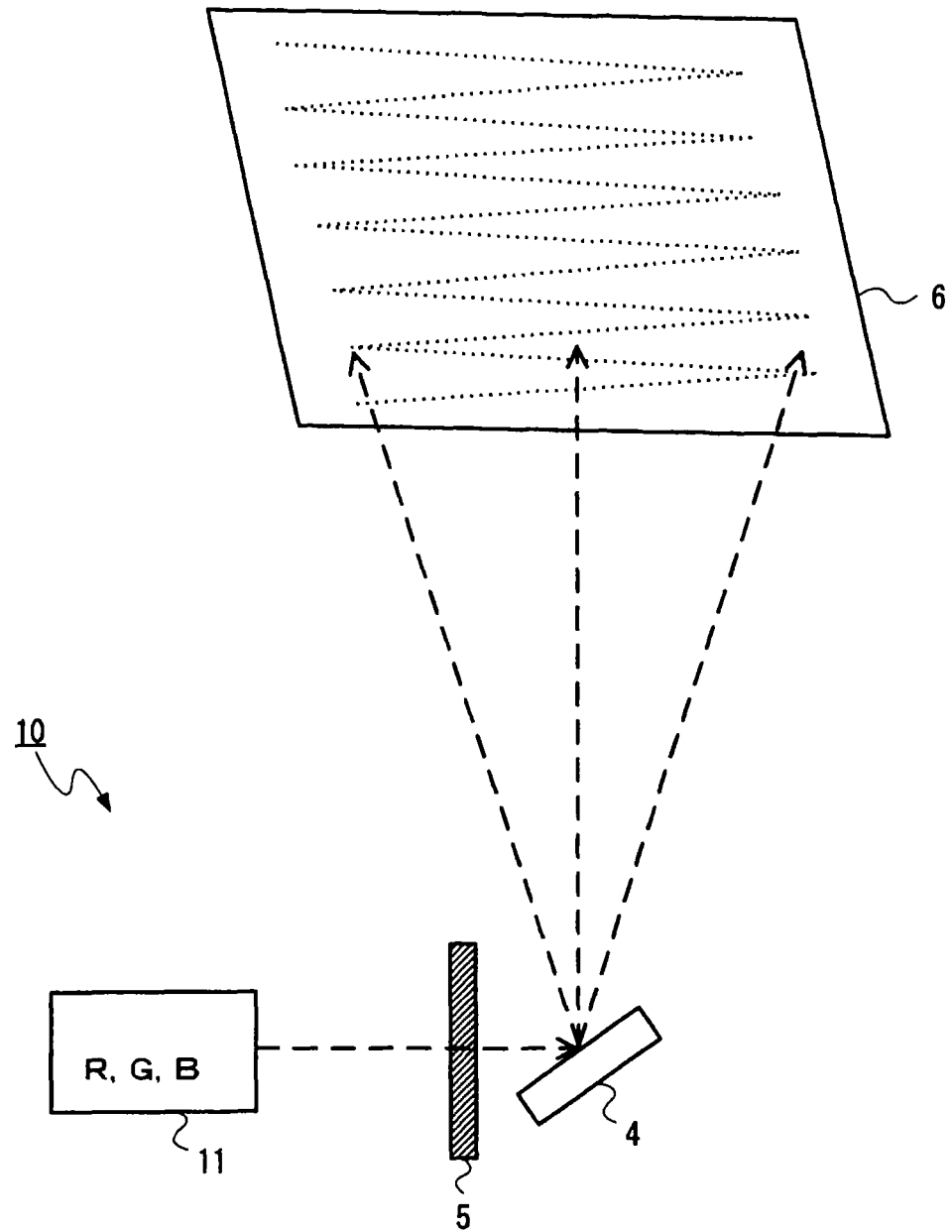
FIG. 13 is a constructive conceptual rendering showing another example of the scanning display device of the invention.
Figure 14:
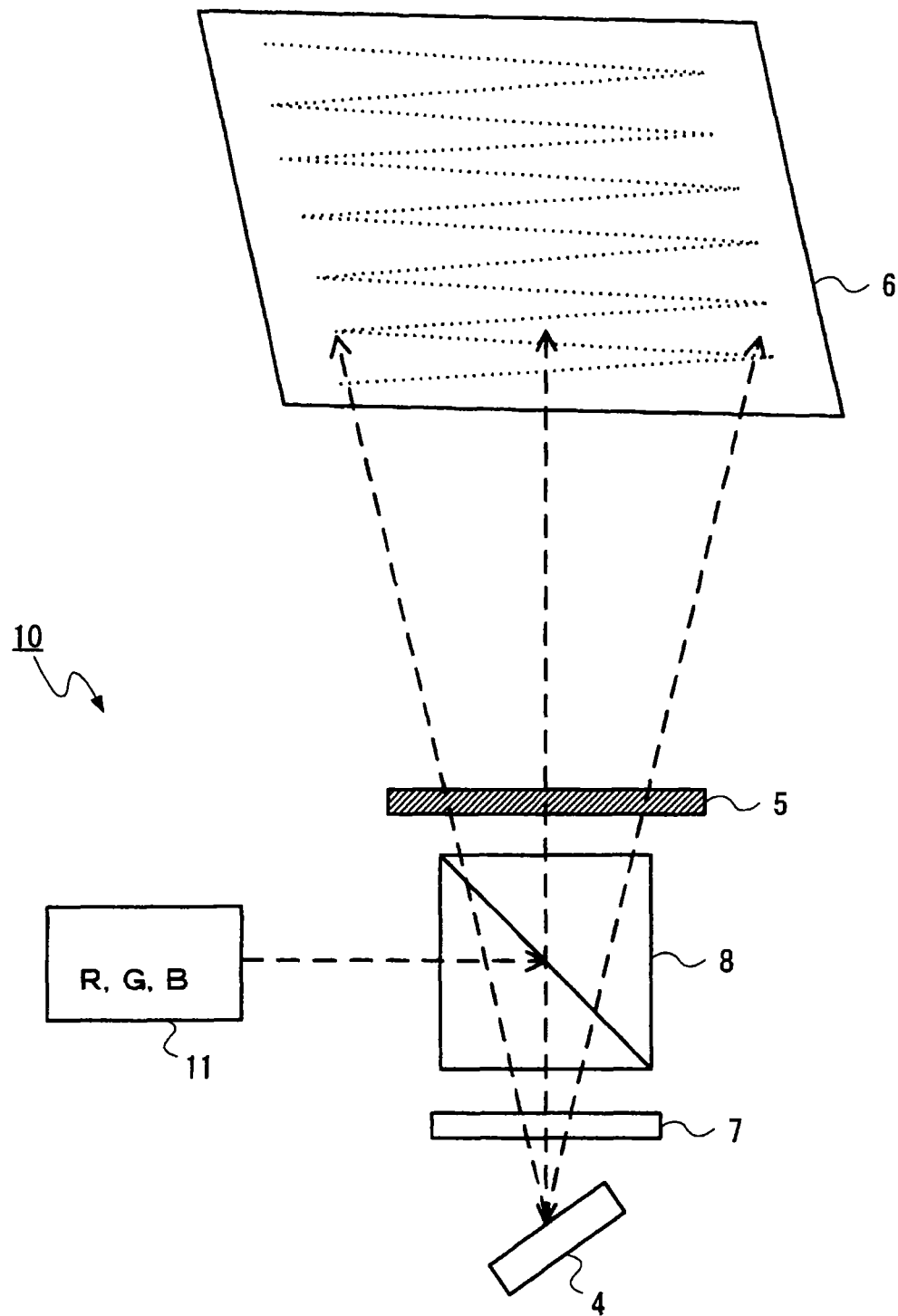
FIG. 14 is a constructive conceptual rendering showing the other example of the scanning display device of the invention.

FIGS. 13 and 14 are constructive conceptual renderings that show another example structure of the scanning display device of the invention. Illustrated in the example shown in FIG. 1 is an example in which the depolarizer 5 is interposed between the 2D scan mirror 4 and the screen 6. However, as shown in FIG. 13, even when the depolarizer 5 is placed at any point along an optical path between the light source optical system 11 and the 2D scan mirror 4, a similar advantage can be yielded.

As shown in FIG. 14, the scanning display device that serves as an objective of application of the speckle reduction method of the invention is not limited to the structure shown in FIG. 1 or FIG. 13. For instance, the method is also applicable to the scanning display device that uses a polarized beam splitter. The scanning display device 10 shown in FIG. 14 is equipped with the 2D scan mirror 4 for scanning a display plane of the screen 6 with light; the light source optical system 11 including at least one light source section 1 that emits coherent light; a polarized beam splitter 8; a quarter wavelength plate 7 that changes a direction of polarization to let the light reflected from the 2D scan mirror 4 pass through the polarized light beam splitter 8; and the scanning-type depolarizer 5.

In the scanning optical unit 10 shown in FIG. 14, linearly polarized light exiting from the light source optical system 11 undergoes reflection on the polarized beam splitter 8 and passes through the quarter wavelength plate 7, to thereby turn into circularly polarized light. The circularly polarized light enters a mirror plane of the 2D scan mirror 4.

The light reflected from the 2D scan mirror 4 again passes through the quarter wavelength plate 7, to thus be converted into a linearly polarized wave. The thus-converted light is polarized in a direction perpendicular to the light that has entered the polarized beam splitter 8 and travels straightforward through the polarized beam splitter 8, to thus arrive at the screen 6.

In the case of the scanning display device 10 shown in FIG. 14, the essential requirement is to place the depolarizer 5 between the polarized beam splitter 8 and the screen 6. Specifically, all you need to do is to let the linearly polarized light that has passed through the polarized beam splitter 8 after undergoing reflection on the 2D scan mirror 4 enter the depolarizer 5. As a result of being arranged as mentioned above, the depolarizer 5 lets the light reflected from the 2D scan mirror 4 arrive at the screen 6 as light that has in its beam diameter an uneven predetermined polarized light distribution.

As above, in the embodiment, the depolarizer 5 that has a retardation distribution in which retardation consecutively changes within the element plane is used in the scanning display device, whereby the polarized light distribution that consecutively changes can be exhibited in a beam diameter of the light to scan the screen while preventing deterioration of beam quality, which would otherwise be caused by scattering or diffraction. Since different speckle patterns can be superposed one over another within a domain of spatial and temporal resolution of the human eyes, retardation can be reduced.

Moreover, the speckle reduction method of the invention obviates a necessity for aligning an optical axis of light with an optical axis of the element. Hence, a high degree of assembly precision is not required, and the speckle noise can be reduced by means of a simple configuration.

Described in connection with the above explanations is the example in which the polarized light distribution that consecutively changes is exhibited in a beam diameter of the light which scans the screen by use of the retardation-distribution-type depolarizer 5. The element that exhibits such polarized light distribution in outgoing polarized light, however, is not limited to a retardation-distribution-type depolarizer. The same can be accomplished by means of; for instance, providing the element with an optical axis distribution in which an orientation of an optical axis of a birefringent material consecutively changes within a plane in addition to providing the retardation distribution to the element.

Figure 15A:
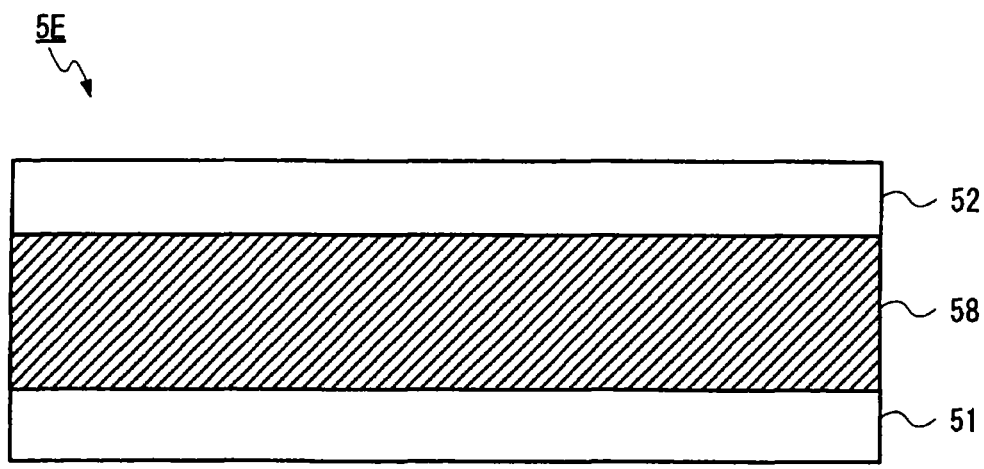
FIGS. 15A and 15B are constructive conceptual renderings showing another example of the depolarizer 5 of the embodiment.
Figure 15B:
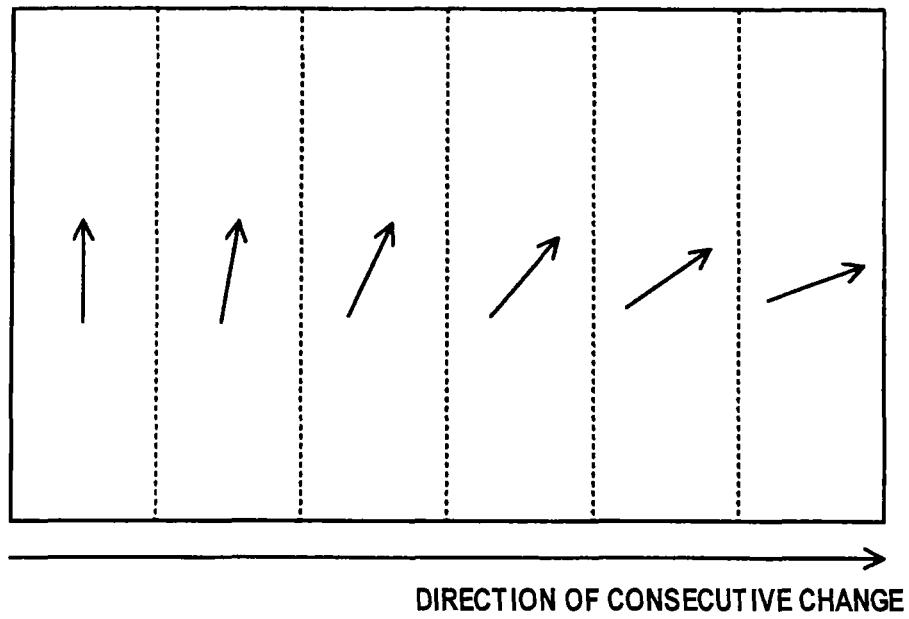
Figure 16:
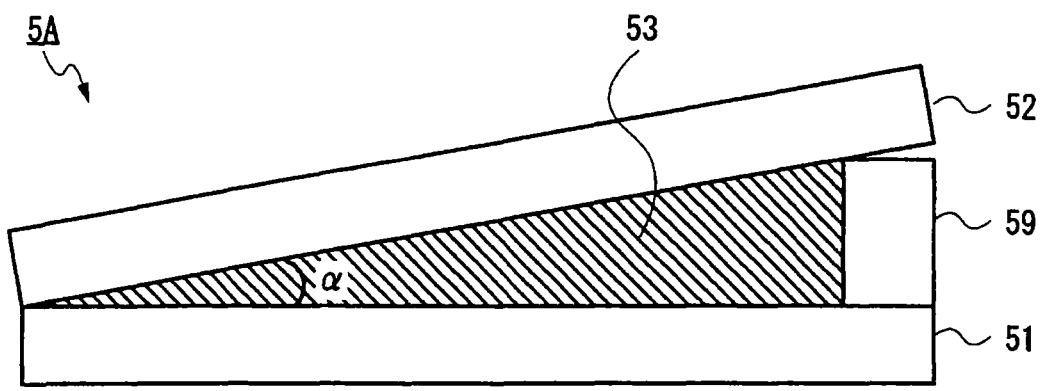
FIG. 16 is a constructive conceptual rendering showing a depolarizer 5 (5A) of a first example.

FIGS. 15A and 15B are constructive conceptual renderings showing still another example of the depolarizer 5 of the embodiment. FIG. 15A is a schematic cross sectional view showing another example of the depolarizer 5 of the embodiment. FIG. 15B is an explanatory view showing, in the form of a top view of the element, an example of an optical axis distribution of a birefringent material belonging to the depolarizer 5 (5E) shown in FIG. 15A. The depolarizer 5E shown in FIGS. 15A and 15B is an example of the depolarizer that has an optical axis distribution in which an orientation of an optical axis of the birefringent material consecutively changes within the element plane. The depolarizer that has such an optical axis distribution is often called an optical-axis-distribution-type polarized light cancellation element hereunder.

The depolarizer 5E shown in FIG. 15A has a birefringent layer 58 between the two transparent substrates 51 and 52.

The essential requirement for the transparent substrates 51 and 52 is that both of them should exhibit transparency against incident light. Hence, a variety of materials, such as a resin plate and a resin film, are available. Incidentally, in view of durability, use of an inorganic material, such as glass and quartz glass, is preferable. Moreover, when an optically isotropic material is used, transmitted light is not affected by birefringence. For this reason, use of the optically isotropic material is preferable.

As shown in FIGS. 15A and 15B, the birefringent layer 58 is divided into a plurality of sub-regions along a given direction within an in-plane area and also configured such that a change in optical axis which occurs between adjacent divided sub-regions falls within a range of predetermined angle. Supposing, for instance, a direction in which the optical axis is to be consecutively changed (described as a "direction of consecutive change" in the drawings) is a direction from the left end to the right end of the drawing. In such a case, when divided sub-regions arranged along the direction of consecutive change are sequentially called a first region, a second region, . . . , the nth region, directions of slow axes of these respective sub-regions can also be aligned to a direction in which angles are equally spaced in this sequence.

The depolarizer 5E shown in FIGS. 15A and 15B can also be provided with an alignment layer which shows a desirable rubbing angle in each of sub-divided regions; by means of; for instance, sequentially rubbing polyimide formed over a transparent substrate while a corresponding mask is sequentially held in contact with each of the sub-divided regions when the polyimide is subjected to rubbing treatment in the course of formation of an alignment layer on the transparent substrate. Alternatively, the alignment layer can also be exposed to polarized UV light while a portion of the mask corresponding to each of the sub-divided regions is sequentially brought into contact with the alignment layer, thereby acquiring an alignment layer that has a desirable orientation. In addition, liquid crystal polymer is formed over the alignment layer to a desirable thickness, whereby a layer of liquid crystal polymer that has a uniform thickness and whose optical axis is aligned to a rubbing direction of the alignment layer can also be obtained. Incidentally, it is preferable that a thickness and/or Δn of the layer of liquid crystal polymer; namely, the birefringent layer 58, be regulated in such a way that retardation assumes a value of about $\lambda/2$. Provided that retardation assumes a value of $\lambda/2$, a direction of incident polarized light can be rotated along a diametral orbit of the Poincare sphere, so that high performance for depolarizing polarized light is exhibited. The value is preferably $\lambda/2\pm0.2\lambda$, and more preferably $\lambda/2\pm0.1\lambda$.

The example shown in FIGS. 15A and 15B illustrates the exemplification of the optical axis consecutively changing along the horizontal direction in the drawings. The splitting direction is not limited to the horizontal direction, and the birefringent layer may also be split in any direction, so long as the optical axes are aligned in a given direction. Moreover, a criterion for determining whether or not the optical axis consecutively changes may be one according to which a change in optical axis from one region to another adjoining region within the element plane falls within a range of 20 degrees or less, the change can also be determined to be consecutive. A range of 10 degrees or less is more preferable. Further, a preferable optical axis distribution shows a change of 45 degrees to 270 degrees/beam diameter. The optical axis is, at this time, considered to be in an equivalent state every 180 degrees. In short, an optical axis at an angle of 0 degree can be considered to be equal to an optical axis at an angle of 180 degrees. This means that a change in the state of polarization laps around half (i.e., 45 degrees) to three times (270 degrees) the Poincare sphere with respect to the beam diameter.

Even when there is used the depolarizer 5E that has such an optical axis distribution in which the orientation of the optical axis consecutively changes within the element plane, a polarized light distribution that consecutively changes can be exhibited in the beam diameter of the light scanning the screen across while deterioration of beam quality, which would otherwise be caused by scattering or diffraction, is prevented. As a consequence, as a result of such a depolarizer 5E being employed in the scanning display device, the different speckle patterns can be superposed one over another in a domain of spatial and temporal resolution of the human eyes, so that the speckle noise can be reduced. In addition, a high degree of assembly precision is not required, and the speckle noise can be diminished by means of a simple configuration.

EXAMPLES

First Example

A first example of the invention is now described. This example is the exemplification of use of the depolarizer 5A in the embodiment.

First, an antireflection film is formed over one surface of each of the transparent substrates 51 and 52 that are made from a quartz glass substrate having a thickness of 0.3 mm. Next, polyimide is applied over the other side surface of each substrate covered with the antireflection film. The substrates are then baked and linearly rubbed in a single direction, thereby forming alignment layers (not shown).

Next, a wedge-shaped empty cell is fabricated by sandwiching a glass plate 59 having a thickness of 300 micrometers at a depth of 18 mm inside from one side of the substrates in such a way that, in the transparent substrates 51 and 52 on which the alignment layers are respectively formed, the alignment layers face inside and that rubbing directions of the alignment layers become anti-parallel to each other and that an angle between the rubbing directions and the gradient direction comes to 45 degrees, and an angle (a gradient angle α) formed between the substrates is set to about 0.96 degree. A cell gap of the empty cell is subsequently filled with photopolymerizable liquid crystal monomer that has an extraordinary index $n_e$ of 1.563 and an ordinary index $n_o$ of 1.501 at a wavelength of 532 nm. The cell is cured by exposure to UV light, whereby the gradient birefringent layer 53 is formed from liquid crystal polymer.

By means of fabrication being implemented as above, there is obtained an element in which retardation consecutively changes in the gradient direction and in which retardation undergoes one wavelength change every about 0.5 mm at a wavelength of 532 nm in the gradient direction. Specifically, in the element, retardation undergoes a change of $\lambda/2$ every about 0.25 mm in the gradient direction. Therefore, the element acts as the depolarizer 5A that outputs, as light that is orthogonally polarized every 0.25 mm, the linearly polarized light entered at an angle of 45 degrees with respect to the rubbing direction.

The thus-fabricated depolarizer 5A is placed in; for instance, the scanning display device 10 that uses a laser beam and between a screen and a scan mirror which performs a scan at a scan frequency of about 18 kHz in the horizontal direction and a frequency of 60 Hz in the vertical direction and at a horizontal scan angle of about ±24 degrees and a vertical scan angle of about ±13 degrees, whereby speckle noise, which would otherwise be caused by laser interference, can be reduced.

Second Example

A second example of the invention is now described. This example is another exemplification of use of, in the embodiment, the depolarizer 5A that has a polarized light distribution which differs from that exhibited in the first example.

First, an antireflection film is formed over one surface of each of the transparent substrates 51 and 52 that are made from a quartz glass substrate having a thickness of 0.3 mm. Next, polyimide is applied over the other side surface of each substrate covered with the antireflection film. The polyimide films are then baked and linearly rubbed in a single direction, thereby forming alignment layers (not shown).

Next, a wedge-shaped empty cell is fabricated by sandwiching the glass plate 59 having a thickness of 150 micrometers at a depth of 18 mm inside from one side of the substrates in such a way that, in the transparent substrates 51 and 52 on which the alignment layers are respectively formed, the alignment layer surfaces face inside and that the rubbing directions of the alignment layers become anti-parallel to each other and that an angle between the rubbing directions and the gradient direction comes to 45 degrees. Further, an angle (a gradient angle α) which the substrates form with each other is set to about 0.48 degree.

A cell gap of the empty cell is subsequently filled with photopolymerizable liquid crystal monomer that has an extraordinary index $n_e$ of 1.563 and an ordinary index $n_o$ of 1.501 at a wavelength of 532 nm. The cell is cured by exposure to UV light, whereby the gradient birefringent layer 53 is formed from liquid crystal polymer.

By means of fabrication being implemented as above, there is obtained an element in which retardation consecutively changes in the gradient direction and in which retardation undergoes one wavelength change every about 1 mm at a wavelength of 532 nm in the gradient direction. Specifically, in the element, retardation undergoes a change of λ/2 every about 0.5 mm in the gradient direction. Therefore, the element acts as the depolarizer 5A that outputs, as light that is orthogonally polarized every 0.5 mm, the linearly polarized light entered at an angle of 45 degrees with respect to the rubbing direction.

The thus-fabricated depolarizer 5A is placed in; for instance, the scanning display device 10 that uses a laser beam and between a screen and a scan mirror which performs a scan at a scan frequency of about 18 kHz in the horizontal direction and a frequency of 60 Hz in the vertical direction and at a horizontal scan angle of about ±24 degrees and a vertical scan angle of about ±13 degrees, whereby speckle noise, which would otherwise be caused by laser interference, can be reduced.

Third Example

A third example of the invention is now described. This example is the exemplification of use of the depolarizer 5B in the embodiment.

First, an antireflection film is formed over one surface of each of the transparent substrates 51 and 52 that are made from a quartz glass substrate having a thickness of 0.3 mm. A gradient structure having a gradient angle of about 0.96 degree is fabricated, on the other side surface of the transparent substrate 52 covered with the antireflection film, from an isotropic refractive index material that has a refractive index of 1.532 at a wavelength of 532 nm, by means of imprinting and through use of a molding die made by machining. The molding die is pressed against a resin material, or the like, that is an isotropic refractive index material applied over the transparent substrate, thereby forming the isotropic medium layer 54 that forms an isotropic refractive index structure on which the geometry of the molding die is transferred.

Next, polyimide is applied over a surface of the isotropic refractive index structure 54 and the transparent substrate 51. The polyimide is then baked and linearly rubbed at an angle of 45 degrees with respect to the gradient direction, thereby forming alignment layers (not shown). A empty cell is formed in such a way that the alignment layers face inside and that rubbing directions of the alignment layers become anti-parallel to each other, by use of the transparent substrate 52 on which the isotropic refractive index structure 54 is formed and the transparent substrate 51.

A cell gap of the empty cell is subsequently filled with photopolymerizable liquid crystal monomer that has an extraordinary index $n_e$ of 1.563 and an ordinary index $n_o$ of 1.501 at a wavelength of 532 nm. The cell is cured by exposure to UV light, whereby the gradient birefringent layer 53 is formed from liquid crystal polymer.

By means of fabrication being implemented as above, there is obtained an element in which retardation consecutively changes in the gradient direction and in which retardation undergoes one wavelength change every about 0.5 mm at a wavelength of 532 nm in the gradient direction. Specifically, in the element, retardation undergoes a change of λ/2 every about 0.25 mm in the gradient direction. Therefore, the element acts as the depolarizer 5B that outputs, as light that is orthogonally polarized every 0.25 mm, the linearly polarized light entered at an angle of 45 degrees with respect to the rubbing direction.

The thus-fabricated depolarizer 5B is placed in; for instance, the scanning display device 10 that uses a laser beam and between a screen and a scan mirror which performs a scan at a scan frequency of about 18 kHz in the horizontal direction and a frequency of 60 Hz in the vertical direction and at a horizontal scan angle of about ±24 degrees and a vertical scan angle of about ±13 degrees, whereby speckle noise, which would otherwise be caused by laser interference, can be reduced.

Fourth Example

A fourth example of the invention is now described. This example is the exemplification of use of the depolarizer 5C in the embodiment.

First, the birefringent gradient layer 53 is formed by abrading the quartz crystal substrate, which has the extraordinary index $n_e$ axis within the substrate plane, in such a way that the $n_e$ axis forms an angle of 45 degrees with the gradient direction and that the gradient angle comes to about 6.7 degrees. An antireflection film is formed on both surfaces of the quartz crystal substrate on which the birefringent gradient layer 53 is formed.

By means of fabrication being implemented as above, there is obtained an element in which retardation consecutively changes in the gradient direction and in which retardation undergoes one wavelength change every about 0.5 mm at a wavelength of 532 nm in the gradient direction. Specifically, in the element, retardation undergoes a change of λ/2 every about 0.25 mm in the gradient direction. Therefore, the element acts as the depolarizer 5C that outputs, as light that is orthogonally polarized every 0.25 mm, the linearly polarized light entered at an angle of 45 degrees with respect to the optical axis direction.

The thus-fabricated depolarizer 5C is placed in; for instance, the scanning display device 10 that uses a laser beam and between a screen and a scan mirror which performs a scan at a scan frequency of about 18 kHz in the horizontal direction and a frequency of 60 Hz in the vertical direction and at a horizontal scan angle of about ±24 degrees and a vertical scan angle of about ±13 degrees, whereby speckle noise, which would otherwise be caused by laser interference, can be reduced.

Fifth Example

A fifth example of the invention is now described. This example is the exemplification of use of the depolarizer 5E in the embodiment.

First, an antireflection film, is formed over one surface of each of the transparent substrates 51 and 52 that are made from a quartz glass substrate having a thickness of 0.3 mm. Next, polyimide is applied over the other side surface of each substrate covered with the antireflection film and is subsequently baked. Subsequently, the transparent substrates are linearly rubbed in a reference direction while a slit-shaped aperture mask in which apertures, each having a width of 0.091 mm, are formed at a period of 1 mm is kept in contact with the polyimide films of the respective transparent substrates 51 and 52. Subsequently, the polyimide films are again rubbed in a direction of 15 degrees with respect to the reference direction while the slit-shaped aperture mask is displaced by 0.091 mm in a widthwise direction of the aperture. The polyimide films are again rubbed at an angle of 30 degrees with respect to the reference direction while the slit-shaped aperture mask is additionally displaced by 0.091 mm in a widthwise direction of the aperture. Likewise, rubbing is practiced while the slit-shaped aperture mask is sequentially displaced by 0.091 mm and while the rubbing direction is also turned every 15 degrees. There is then formed an alignment layer having an orientation distribution in which the slit-shaped aperture mask is shifted by 0.91 mm and the rubbing direction changes every 15 degrees from one region to another adjacent region and in which the rubbing direction turns through about 180 degrees at a period of 1 mm.

Next, a empty cell is formed such that the alignment layer sides of the transparent substrates 51 and 52 on which the alignment layers are formed face inside and that the rubbing directions of the alignment layers become anti-parallel to each other in each of the regions. A spherical spacer (not shown) is sandwiched between the transparent substrates 51 and 52 such that a cell gap of the empty cell assumes a value of 4.3 micrometers at this time. The cell gap is further filled with photopolymerizable liquid crystal monomer that has an extraordinary index $n_e$ of 1.563 and an ordinary index $n_o$ of 1.501 at a wavelength of 532 nm. The cell is cured by exposure to UV light, thereby forming the birefringent layer 58 in which retardation changes about $\lambda/2$ at a wavelength of 532 nm and in which an optical axis of liquid crystal polymer is distributed.

By means of fabrication being implemented as above, there is obtained an element in which the optical axis of the birefringent layer 58 consecutively changes from one region to another adjacent region and in which the optical axis turns through 45 degrees at every about 0.25 mm in the direction of distribution of the optical axis at a wavelength of 532 nm. Specifically, the element acts as the depolarizer 5E that outputs light which is orthogonally polarized every about 0.25 mm in the direction of distribution of the optical axis.

The thus-fabricated depolarizer 5E is placed in; for instance, the scanning display device 10 that uses a laser beam and between a screen and a scan mirror which performs a scan at a scan frequency of about 18 kHz in the horizontal direction and a frequency of 60 Hz in the vertical direction and at a horizontal scan angle of about ±24 degrees and a vertical scan angle of about ±13 degrees, whereby speckle noise, which would otherwise be caused by laser interference, can be reduced.

Sixth Example

A sixth example of the invention is now described. This example is the exemplification of use of the depolarizer 5D in the embodiment.

First, a quartz glass substrate is used for the transparent substrates 51 and 52. A common electrode is formed on one surface of the transparent substrate 51 made from the quartz glass substrate by means of ITO. Two power supply electrodes are formed at positions, which are separated from each other by about 5 mm, on the transparent substrate 52. Moreover, a high resistance film whose sheet resistance value is higher than that of a power supply electrode film is formed between the two power supply electrodes on the transparent electrode 52. Next, polyimide solution is applied over each of the transparent substrates 51 and 52, and the polyimide films are baked and rubbed in one direction, thereby forming unillustrated alignment layers. The alignment layers of the respective transparent substrates are placed opposite each other such that their rubbing directions become opposite to each other, to thereby form a empty cell by way of a sealing material having a thickness of about 90 micrometers. A cell gap of the thus-formed empty cell is filled with an aqueous solution of photopolymerizable liquid crystal monomer that has an extraordinary index $n_e$ of 1.563 and an ordinary index $n_o$ of 1.501. The thus-filled portion is sealed, to thus create a liquid crystal cell.

A voltage is applied to the common electrode on the transparent substrate 51 and the two power supply electrodes on the transparent substrate 52, thereby aligning orientation vectors (molecular orientation axes) of liquid crystal molecules to a predetermined orientation. The liquid crystal cell is polymerized and cured by exposure to UV light. If two different voltages that are in phase with each other are applied to the two power supply electrodes on this occasion, an electric potential of the high resistance film formed between the power supply electrodes consecutively varies, so that the voltage applied to the liquid crystal also consecutively changes. Accordingly, the liquid crystal cell is polymerized and cured while the liquid crystal has consecutively changed tilt angles. Thus, there is formed the liquid crystal layer 57 in which effective $\Delta n$ of liquid crystal polymer is distributed.

By means of fabrication being implemented as above, there is obtained an element in which retardation consecutively changes in the direction of orientation of the liquid crystal polymer (i.e., the rubbing directions) and in which retardation undergoes one wavelength change every about 0.5 mm at a wavelength of 532 nm in the rubbing directions. Specifically, in the element, retardation undergoes a change of $\lambda/2$ every about 0.25 mm in the rubbing direction. Therefore, the element acts as the depolarizer 5D that outputs, as the light that is orthogonally polarized every 0.25 mm, the linearly polarized light entered at an angle of 45 degrees with respect to the rubbing directions.

The thus-fabricated depolarizer 5D is placed in; for instance, the scanning display device 10 that uses a laser beam and between a screen and a scan mirror which performs a scan at a scan frequency of about 18 kHz in the horizontal direction and a frequency of 60 Hz in the vertical direction and at a horizontal scan angle of about ±24 degrees and a vertical scan angle of about ±13 degrees, whereby speckle noise, which would otherwise be caused by laser interference, can be reduced.

The invention is preferably applicable, as a scanning display device that uses a coherent light source, to the use of reduction of speckle noise.

What is claimed is:
1. A scanning display device, comprising:
 a light source section including at least one light source configured to emit coherent light;
 a light scanning section including:
  a scan mirror configured to reflect the light originated from the light source section and scan over a screen; and a turning section configured to turn the scan mirror;

a depolarizer having outgoing polarized light distribution in which a state of polarization of outgoing light consecutively changes within an element plane, wherein:

the depolarizer is placed in an optical path along which the light emitted by the light source section reaches the screen; and the state of polarization of the light is changed, thereby scanning the screen with light that has a polarized light distribution, in which the state of polarization consecutively changes, in a beam diameter.

2. The scanning display device according to claim 1, wherein the depolarizer has a retardation distribution in which retardation consecutively changes within the element plane, thereby exhibiting the outgoing polarized light distribution.

3. The scanning display device according to claim 2, wherein the depolarizer has a retardation distribution which causes a change of $0.5\lambda$ to $3\lambda$ with respect to the beam diameter.

4. The scanning display device according to claim 2, wherein:

the depolarizer has a birefringent layer made of a birefringent material; and the retardation distribution is exhibited by a thickness of the birefringent layer.

5. The scanning display device according to claim 4, wherein the birefringent material is liquid crystal polymer.

6. The scanning display device according to claim 2, wherein:

the depolarizer has a birefringent layer made of a birefringent material; and the retardation distribution is exhibited by control of a tilt angle of an optical axis of the birefringent layer.

7. The scanning display device according to claim 6, wherein the birefringent material is liquid crystal polymer.

8. The scanning display device according to claim 1, wherein the depolarizer has an optical axis distribution in which an orientation of an optical axis of a birefringent material consecutively changes within the element plane, and thereby exhibits the outgoing polarized light distribution.

9. The scanning display device according to claim 8, wherein:

the depolarizer has a birefringent layer made of a birefringent material; and retardation of the birefringent layer is $\lambda/2 \pm 0.2\lambda$.

10. The scanning display device according to claim 8, wherein the birefringent material is liquid crystal polymer.

11. The scanning display device according to claim 8, wherein the depolarizer has an optical axis distribution in which an optical axis causes a change from 45 degrees to 270 degrees with respect to a beam diameter.

12. The scanning display device according to claim 1, wherein the depolarizer has an outgoing polarized light distribution in which a state of polarization of outgoing light changes within the element plane along a diametral orbit of a Poincare sphere.

13. A speckle reduction method to be applied to a scanning display device that uses a coherent light source, comprising:

placing a depolarizer that has an outgoing polarized light distribution in which a state of polarization of outgoing light consecutively changes within an element plane, in an optical path along which coherent light emitted by a light source section reaches a screen, thereby changing the state of polarization of light; and scanning the screen with light that has a polarized light distribution, in which the state of polarization consecutively changes, in a beam diameter.

* * * * *